(12) United States Patent
Bhatoolaul et al.

(10) Patent No.: US 12,495,397 B2
(45) Date of Patent: Dec. 9, 2025

(54) COMMUNICATIONS WITH PRECONFIGURED UPLINK RESOURCES

(71) Applicant: NOKIA TECHNOLOGIES OY, Espoo (FI)

(72) Inventors: David Bhatoolaul, Swindon (GB); Rapeepat Ratasuk, Hoffman Estates, IL (US); Srinivasan Selvaganapathy, Bangalore (IN); Haitao Li, Beijing (CN); Matthew Baker, Cambridge (GB)

(73) Assignee: NOKIA TECHNOLOGIES OY, Espoo (FI)

( * ) Notice: Subject to any disclaimer, the term of this patent is extended or adjusted under 35 U.S.C. 154(b) by 538 days.

(21) Appl. No.: 17/292,766

(22) PCT Filed: Nov. 12, 2018

(86) PCT No.: PCT/CN2018/115106
§ 371 (c)(1),
(2) Date: May 11, 2021

(87) PCT Pub. No.: WO2020/097775
PCT Pub. Date: May 22, 2020

(65) Prior Publication Data
US 2021/0400640 A1    Dec. 23, 2021

(51) Int. Cl.
*H04W 72/04*    (2023.01)
*H04L 1/1607*    (2023.01)

(52) U.S. Cl.
CPC ........... *H04W 72/04* (2013.01); *H04L 1/1607* (2013.01)

(58) Field of Classification Search
CPC .................................................. H04W 72/04
See application file for complete search history.

(56) References Cited

U.S. PATENT DOCUMENTS

2010/0182964 A1    7/2010    Ojala et al.
2012/0033613 A1*    2/2012    Lin ..................... H04W 74/085
                                                                         370/328

(Continued)

FOREIGN PATENT DOCUMENTS

CN            105451211 A      3/2016
WO    WO 2016/182391 A1    11/2016
WO       2018/107944 A1    6/2018

OTHER PUBLICATIONS

International Search Report and Written Opinion dated Aug. 15, 2019 corresponding to International Patent Application No. PCT/CN2018/115106.

(Continued)

*Primary Examiner* — Abdeltif Ajid
(74) *Attorney, Agent, or Firm* — SQUIRE PATTON BOGGS (US) LLP (57) ABSTRACT

Embodiments of the present disclosure relate to communications with preconfigured uplink resources (PUR). A method implemented at a terminal device comprises identifying a need to change a transmission configuration of the terminal device, the terminal device being in a transmission mode with a set of preconfigured uplink resources (PURs) allocated for the terminal device to transmit user data to a network device; and in response to identifying the need to change the transmission configuration, transmitting control information to the network device using a first PUR in the set of PURs, the control information comprising information relevant to the change of the transmission configuration. In this way, it is possible to enable the terminal device to save power, time, and resources by bypassing a full random access procedure when the transmission configuration is needed to be changed.

15 Claims, 3 Drawing Sheets

(56) References Cited

U.S. PATENT DOCUMENTS

| | | | |
|---|---|---|---|
| 2017/0071010 A1* | 3/2017 | Lim .................. | H04W 72/21 |
| 2018/0176945 A1 | 6/2018 | Cao et al. | |
| 2020/0107396 A1* | 4/2020 | Wang ................. | H04L 5/0082 |
| 2021/0385834 A1* | 12/2021 | Morozov ............. | H04W 72/23 |
| 2021/0392659 A1* | 12/2021 | Tirronen ............. | H04W 72/535 |

OTHER PUBLICATIONS

Extended European Search Report corresponding to EP Appln. No. 18940300.9, dated May 31, 2022.
Samsung, "Discussion on transmission in preconfigured UL resources for NB-IOT", 3GPP TSG RAN WG1 Meeting #95, Spokane, USA, Nov. 12-16, 2018, R1-1812947, 6 pages.
Sierra Wirelss, "LTE-M Pre-configured UL Resources Design Considerations" 3GPP TSG RAN WG1 Meeting 195, Spokane, USA, Nov. 12-16, 2018, R1-1812724, 11 pages.
Indian Office Action corresponding to IN Appln. No. 202147025705, dated Jun. 15, 2022.
First Office Action dated Nov. 23, 2023 corresponding to Chinese Patent Application No. 201880100598.8, with English summary thereof.
Chinese Office Action issued in corresponding Chinese Application No. 2018801005988 on May 23, 2024.
Chinese Office Action issued in corresponding Chinese Patent Application No. 201880100598.8 on Sep. 10, 2024.

\* cited by examiner

COMMUNICATIONS WITH PRECONFIGURED UPLINK RESOURCES

FIELD

Embodiments of the present disclosure generally relate to the field of telecommunication and in particular, to communications with preconfigured uplink resources.

BACKGROUND

In the communications arena, there is a constant evolution ongoing in order to provide efficient and reliable solutions for utilizing wireless communication networks. Each new generation has it owns technical challenges for handling the different situations and processes that are needed to connect and serve devices connected to the wireless network. To meet the demand for wireless data traffic having increased since deployment of 4th generation (4G) communication systems, efforts have been made to develop an improved 5th generation (5G) or pre-5G communication system. The new communication systems can support various types of service applications for terminal devices.

In recent communication systems, one of the characteristics is transmission of small data packets as part of one single access. The connection setup related signaling and power consumption overheads needs to be minimized as much as possible to support transmission of the small data packets. It has been proposed to support transmissions over preconfigured uplink resources (PURs). The terminal devices allocated with PURs can directly transmit uplink user data using the PURs without requiring to establish a Radio Resource Control (RRC) connection and/or to obtain grants.

SUMMARY

In general, example embodiments of the present disclosure provide a solution for communications with preconfigured uplink resources.

In a first aspect, there is provided a method implemented at a terminal device. The method comprises identifying a need to change a transmission configuration of the terminal device, the terminal device being in a transmission mode with a set of preconfigured uplink resources (PURs) allocated for the terminal device to transmit user data to a network device; in response to identifying the need to change the transmission configuration, transmitting control information to the network device using a first PUR in the set of PURs, the control information comprising information relevant to the change of the transmission configuration.

In a second aspect, there is provided a method implemented at a network device. The method comprises receiving, from a terminal device in a transmission mode, an uplink signal on a first preconfigured uplink resource (PUR) in a set of PURs, the set of PURs being allocated in the transmission mode for the terminal device to transmit user data to the network device; and detecting control information from the received uplink signal, the control information comprising information relevant to the change of the transmission configuration in the transmission mode.

In a third aspect, there is provided a terminal device. The terminal device comprises at least one processor; and at least one memory including computer program codes; the at least one memory and the computer program codes are configured to, with the at least one processor, cause the device to identify a need to change a transmission configuration of the terminal device, the terminal device being in a transmission mode with a set of preconfigured uplink resources (PURs) allocated for the terminal device to transmit user data to a network device, and in response to identifying the need to change the transmission configuration, transmit control information to the network device using a first PUR in the set of PURs, the control information comprising information relevant to the change of the transmission configuration.

In a fourth aspect, there is provided a network device. The network device comprises at least one processor; and at least one memory including computer program codes; the at least one memory and the computer program codes are configured to, with the at least one processor, cause the device to receive, from a terminal device in a transmission mode, an uplink signal on a first preconfigured uplink resource (PUR) in a set of PURs, the set of PURs being allocated in the transmission mode for the terminal device to transmit user data to the network device; and detect control information from the received uplink signal, the control information comprising information relevant to the change of the transmission configuration in the transmission mode.

In a fifth aspect, there is provided an apparatus for communications comprising means for performing steps of the method according to the above first aspect.

In a sixth aspect, there is provided an apparatus for communications comprising means for performing steps of the method according to the above second aspect.

In a seventh aspect, there is provided a non-transitory computer readable medium comprising program instructions for causing an apparatus to perform at least the method according to the above first aspect.

In an eighth aspect, there is provided a non-transitory computer readable medium comprising program instructions for causing an apparatus to perform at least the method according to the above second aspect.

It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Some example embodiments will now be described with reference to the accompanying drawings, where.

Throughout the drawings, the same or similar reference numerals represent the same or similar element.

DETAILED DESCRIPTION

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used in this application, the term "circuitry" may refer to one or more or all of the following:
(a) hardware-only circuit implementations (such as implementations in only analog and/or digital circuitry) and
(b) combinations of hardware circuits and software, such as (as applicable):
  (i) a combination of analog and/or digital hardware circuit(s) with software/firmware and
  (ii) any portions of hardware processor(s) with software (including digital signal processor(s)), software, and memory(ies) that work together to cause an apparatus, such as a mobile phone or server, to perform various functions) and
(c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the term "communication network" refers to a network following any suitable communication standards, such as Long Term Evolution (LTE), LTE-Advanced (LTE-A), Wideband Code Division Multiple Access (WCDMA), High-Speed Packet Access (HSPA), Narrow Band Internet of Things (NB-IoT) and so on. Furthermore, the communications between a terminal device and a network device in the communication network may be performed according to any suitable generation communication protocols, including, but not limited to, the first generation (1G), the second generation (2G), 2.5G, 2.75G, the third generation (3G), the fourth generation (4G), 4.5G, the future fifth generation (5G) communication protocols, and/or any other protocols either currently known or to be developed in the future. Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

As used herein, the term "network device" refers to a node in a communication network via which a terminal device accesses the network and receives services therefrom. The network device may refer to a base station (BS) or an access point (AP), for example, a node B (NodeB or NB), an evolved NodeB (eNodeB or eNB), a NR NB (also referred to as a gNB), a Remote Radio Unit (RRU), a radio header (RH), a remote radio head (RRH), a relay, a low power node such as a femto, a pico, and so forth, depending on the applied terminology and technology.

The term "terminal device" refers to any end device that may be capable of wireless communication. By way of example rather than limitation, a terminal device may also be referred to as a communication device, user equipment (UE), a Subscriber Station (SS), a Portable Subscriber Station, a Mobile Station (MS), or an Access Terminal (AT). The terminal device may include, but not limited to, a mobile phone, a cellular phone, a smart phone, voice over IP (VoIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE), an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. In the following description, the terms "terminal device", "communication device", "terminal", "user equipment" and "UE" may be used interchangeably.

Figure 1:
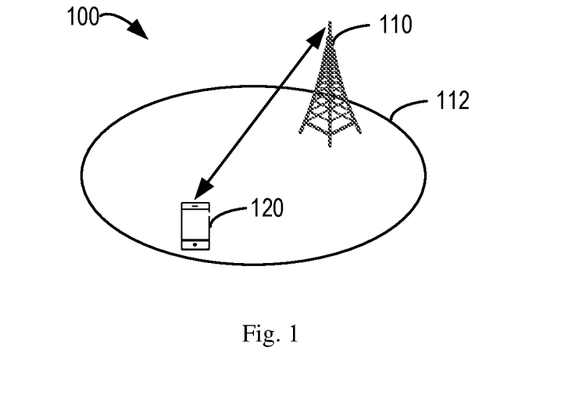
FIG. 1 illustrates an example communication network in which embodiments of the present disclosure may be implemented.

FIG. 1 illustrates an example communication system 100 in which embodiments of the present disclosure may be implemented. The system 100 includes a network device 110 and a terminal device 120 served by the network device 110 within its serving area (also called as a cell 102). The serving area of the network device 110 is called as a cell 102. It is to be understood that the number of network devices and terminal devices is only for the purpose of illustration without suggesting any limitations. The system 100 may include any suitable number of network devices and terminal devices adapted for implementing embodiments of the present disclosure. Although not shown, it would be appreciated that one or more terminal devices may be located in the cell 102 and served by the network device 110.

Communications in the communication system 100 may be implemented according to any proper communication protocol(s), comprising, but not limited to, cellular communication protocols of the first generation (1G), the second generation (2G), the third generation (3G), the fourth generation (4G) and the fifth generation (5G) and on the like, wireless local network communication protocols such as Institute for Electrical and Electronics Engineers (IEEE) 802.11 and the like, and/or any other protocols currently known or to be developed in the future. Moreover, the communication may utilize any proper wireless communication technology, comprising but not limited to: Code Divided Multiple Address (CDMA), Frequency Divided Multiple Address (FDMA), Time Divided Multiple Address (TDMA), Frequency Divided Duplexer (FDD), Time Divided Duplexer (TDD), Multiple-Input Multiple-Output (MIMO), Orthogonal Frequency Divided Multiple Access (OFDMA) and/or any other technologies currently known or to be developed in the future.

In some cases of communications between the network device and the terminal device, a set of preconfigured uplink resources (PURs) can be allocated to the terminal device to support uplink transmissions. The PURs are generally allocated to the terminal device having valid timing advance (TA) in either an idle mode or a connected mode. The allocation of PURs is especially beneficial for communications with lower signaling and energy consumption overheads because the terminal device is allowed to directly transmit uplink data using the PURs without requiring to establish a Radio Resource Control (RRC) connection and/or to obtain grants. Thus, the PURs can be supported in use cases such as Machine Type Communication (MTC), IoT, Narrow Band-IoT (NB-IoT), and the like.

As such, as compared with legacy transmission modes such as a Random Access Channel (RACH) procedure, Early Data Transmission (EDT), Semi-Persistent Scheduling (SPS), and Radio Resource Control (RRC) connection establishment, transmission using the PURs can reduce the level of control signaling required between the terminal device and the network device, thereby reducing the power consumption of the terminal device 120 and saving air interface resources.

There are at least three different types of PURs that can be allocated to a specific terminal device. A first type of PURs includes PURs without any collisions or contention with other terminal devices and thus can be referred to as dedicated PURs. A second type of PURs includes shared PURs without any contention with other terminal devices. A third type of PURs includes shared PURs with a possibility of collisions and therefor contention. All of the three types of PURs may be allocated by the network device to the terminal devices based on their different target use cases, for example small packets of either periodic or aperiodic traffic.

Currently, signalling support for (all the three types of) PURs has only been discussed at a high level. It has been currently discussed and agreed that PURs for transmission of data are indicated by RRC signaling, at least by UE-specific RRC signaling. In addition, for UL transmission on PURs, a fallback mechanism to the RACH or EDT procedure is supported. However, during communications with PURs, there are some events when the terminal devices need to change its transmission configuration, for example, change either their connection status or PUR allocation.

One possible solution for a terminal device in an idle mode to change its connection status or PUR allocation is to reestablish an RRC connection via a legacy random access procedure such as a RACH procedure. However, performing a random access procedure is costly in terms of preamble, time, and/or frequency resources, and power and time of the terminal device. In addition, depending on the type of PURs being used, the terminal device/the network device may require additional time to release/reconfigure those resources in different events.

In some cases where the terminal device needs a downlink channel to receive downlink user data in response to uplink transmission on the PURs, there has been some discussions. One of the solutions is that the network device can optionally provide sub-paging occasions (POs) for the terminal device when an uplink message is transmitted using a PUR. The sub-POs has a much shorter periodicity than that of the original PO. The network device can use these sub-POs to provide the terminal device with downlink application layer feedback. In this case, the terminal device has to monitor more POs which might increase its power consumption. In addition, the terminal device still cannot request to change its PUR allocation without performing the costly RACH procedure.

According to embodiments of the present disclosure, there is proposed a solution for communications with PURs. If a terminal device needs to change a transmission configuration in a transmission mode of using PURs, the terminal device uses a PUR in a set of PURs allocated for transmission of user data to transmit control information (for example, RRC control messages) to a network device. The network device can thus receive and decode the control information on the specific PUR. This solution is to provide developments and enhancements to enable the terminal device to save power, time, and resources by bypassing a full random access procedure when the transmission configuration is needed to be changed.

Figure 2:
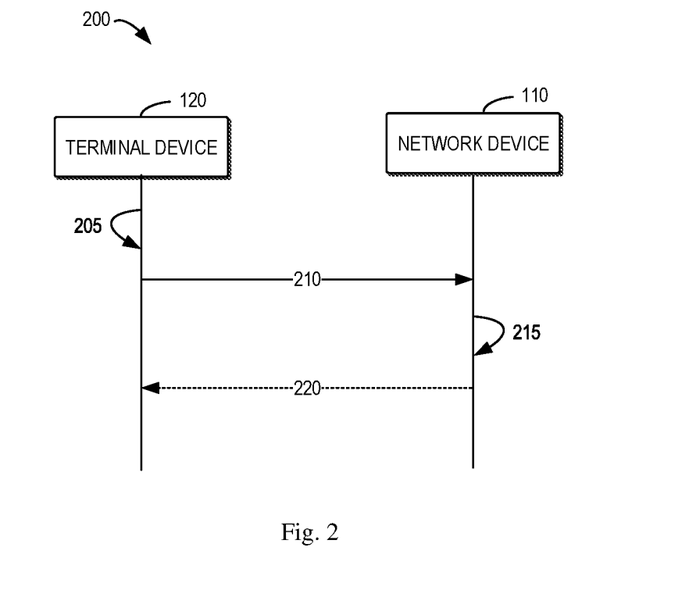
FIG. 2 illustrates a flowchart illustrating a process for communications with preconfigured uplink resources according to some embodiments of the present disclosure.

Principle and embodiments of the present disclosure will be described in detail below with reference to FIG. 2, which shows a process 200 for communications with PURs according to an embodiment of the present disclosure. For the purpose of discussion, the process 200 will be described with reference to FIG. 1. The process 200 may involve the terminal device 120 and the network device 110 as illustrated in FIG. 1.

In the process 200, the terminal device 120 identifies 205 a need to change a transmission configuration of the terminal device 120. The terminal device 120 is in a transmission mode where a set of PURs are allocated for the terminal device 120 to transmit user data to the network device 110. The terminal device 120 may be in either an idle mode or a connected mode in such transmission mode. To use the PURs, the terminal device 120 usually has valid TA or can verify that its TA is valid such that time alignment with the network device 110 can be ensured while using the PURs that are allocated in advance. The PURs may be any of the three types of PURs as mentioned above. The terminal device 120 is allowed to directly transmit uplink user data using the set of PURs.

In some cases, there may be some events where the terminal device 120 has a need to change its transmission configuration when this device is currently in the transmission mode of using the PURs. In particular, the terminal device 120 may need to change the PUR allocation, to request a downlink transmission from the network device 110. Alternatively, or in addition, the terminal device 120 sometimes may need to change a connection status with the network device 110, for example, to change a RRC connection or to change from the transmission mode of using PURs to a different transmission mode (such as EDT).

In some examples, the terminal device 120, when being in the idle mode, may expect to perform transmissions that can only be done in a connected mode or have expected upcoming downlink data to be obtained. Thus, the terminal device 120 may expect a full downlink and uplink connection with the network device 110 or would like to have a temporary downlink connection given the expectation of downlink data to be received in response to the uplink user data on the last PUR.

In some examples, the terminal device 120 observes a high failure rate of PUR transmission or a high average number of retransmission and thus determines that some parameters in the transmission mode of using PURs such as a transport block size (TBS) or a modulation coding scheme (MCS) or power control parameter may needed to be modified. Alternatively, or in addition, the terminal device 120 may desire to update the PUR configuration including its periodicity and/or TBSs to reflect the demand for resources. The terminal device 120 may desire to obtain more PURs or to release some of the PURs early since it is known that those resources are no longer used. Sometimes the terminal device 120 may also expect to update timing alignment offset with the network device 110.

To indicate some or all of the above changes to the transmission configuration, control information instead of user data is required to be transmitted to the network device 110. In embodiments of the present disclosure, in response to identifying the need to change the transmission configuration, to bypass a full random access procedure, the terminal device 120 selects a PUR (referred to as a first PUR hereinafter for purpose of discussion) from the set of PURs and transmits 210 control information, which comprising information relevant to the change of the transmission configuration, to the network device 110 using the first PUR. That is to say, the terminal device 120 can decide reuse of the PUR for transmission of control information if needed. Such transmission of control information can be applicable to all types of PURs including dedicated PURs and shared PURs with/without contention. If no transmission configuration is expected to be changed, the terminal device 120 may not transmit the control information.

In some embodiments, the terminal device 120 does not transmit the control information and the user data simultaneously using the first PUR. That is, only the control information is transmitted on the first PUR. Alternatively, the control information may be transmitted along with the user data using the first PUR. In this case, the control information may be incorporated as a few bits in a data packet, for example, in a header of the data packet (for example, in a Medium Access Control (MAC) header) to be transmitted to the network device 110. The control information may also be multiplexed or encapsulated in the data packet in other manners.

In some embodiments, the control information may include either explicit or implicit information to indicate a need to change the transmission configuration. In some embodiments, the control information may indicate a request to change a connection status with the network device 110. For example, the terminal device 120 may initiate a request to change from an idle mode to a connected mode or vice versa, to reestablish a connection with the network device 110, or to reconfigure the connection. The connection may be a RRC connection. In these examples, the control information may include signaling related to the connection change, such as a scheduling request, a Radio Resource Control (RRC) Connection request, a RRC Reestablishment request, or a request for reconfiguration of a connection with the network device. In some other examples, the terminal device 120 may request to change the connection in the transmission mode of using PURs to a different type of transmission mode (such as EDT).

Alternatively, or in addition, the terminal device 120 may initiate a request to change allocation of PURs. For example, the terminal device 120 may request to adjust a location of at least one of the set of PURs, to allocate an additional PUR, to release at least one of the set of PURs, and/or to update timing alignment offset with the network device 110. In this case, the control information may include one or more explicit requests to indicate the reallocation of respective PURs in one or more manners.

In the above embodiments of transmitting an explicit request(s) to the network device 110, the network device 110 may respond to such request. In some embodiments, the terminal device 120 may include implicit information such as a Buffer Status Report (BSR) as the control information to implicitly indicate a request to change transmission configuration. The network device 110 may control if the connection status or the PUR allocation of the terminal device 120 is required to be changed based on the BSR. For example, if the BSR indicate a large amount of user data in the buffer, the network device 110 may decide to allocate more PURs or move the terminal device 120 into a full RRC connection. If the network device 110 determines based on the BSR that no change is needed, the implicit control information such as the BSR may be ignored. To assist the network device 110 in downlink allocation, the terminal device 120 may also transmit downlink channel state information as the control information.

To respond to the request or to control the change of the transmission configuration, the network device may need to detect the control information first. If the terminal device 120 transmits the control information using the first PUR, the network device 110 receives an uplink signal on the first PUR and then detects 215 the control information from the received uplink signal. To detect information from a received signal, the network device 110 may use a correct transport block size (TBS) that is used for transmission the information. If more than one TBS are possibly to be used for transmission from the terminal device 120, the network device 110 may perform blind decoding on the received uplink signal using each of the more than one TBS.

In some embodiments, the terminal device 120 may transmit the control information with a TBS that is also used for transmission of the user data. That is, for either control information or user data transmitted on the PURs, the same TBS may be used. It is noted that in some cases more than one TBS may be configured for the terminal device 120 for transmission of the user data. In this case, the terminal device 120 may also transmit the control information using one of the TBSs that are available for transmission of the user data. Depending on the number of the TBSs available for transmission on the PURs, the network device 110 may either directly decode the received uplink signal with the only TBS or perform blind decoding with each of the TBSs. By transmitting the control information and the user data using the same set of PURs and same TBS(s), the network device 110 may have no additional blind decoding to perform. In addition, in this case the control information and the user data may be transmitted together with the same TBS on the first PUR.

In some cases, since the control information may have a smaller size as compared with the user data, to support transmissions of both control information and user data, the TBS(s) may be reduced, while may decrease the efficiency in transmitting the user data. On the other hand, if the normal TBS(s) for transmission of user data is employed, more padding bits are added in transmitting the control information, which may result in resource waste. In some embodiments, the terminal device 120 may select a TBS dedicated for transmission of the control information (referred to as a first TBS hereinafter for purpose of discussion) using the first PUR. The first TBS may be different from a TBS(s) that is used for transmission of the user data (referred to as a second TBS hereinafter for purpose of discussion). By using the dedicated TBS, only the control information may be transmitted on the first PUR. In some examples, considering the small size of the control information, the first TBS may be set as a smaller value. As a specific example, the first TBS may be 88 bits. It would be appreciated that any other sizes of TBS may also be set as the dedicated TBS for transmission of control information.

As an alternative to the first TBS, or in addition, in transmitting the control information using the first PUR, the terminal device 120 may employ a MCS (referred to as a first MCS) that is different from the MCS used in transmission of the user data (referred to as a second MCS). The first MCS may be selected as being optimized for transmission of the control information.

The terminal device 120 may transmit the control information with the first TBS. In decoding the control information, the network device 110 may perform blind decoding on the received uplink signal with each of at least the first and second TBSs. If the uplink signal can be successfully decoded with the first TBS, the network device 110 may detect a result of the decoding as the control information. As compared to normal transmission of user data, the workload at the network device 110 may be increased but the transmission power at the terminal device 120 can be reduced since a smaller size of information is transmitted with the smaller TBS. In addition, it is easy for the network device 110 to identify the control information related to a request to change of the transmission configuration upon successful decoding with the dedicated first TBS.

In the above embodiments, the terminal device 120 can transmit the control information in any of the allocated PURs. In some embodiments, the terminal device 120 may be allowed to transmit the control information if a certain condition is satisfied. Thus, there is a finite window to enable the terminal device 120 to send the control information using the first PUR. In particular, the transmission of the control information may be allowed after specific downlink feedback information, such as after acknowledgement (ACK) information indicating successful transmission of the user data using a PUR in the set of allocated PURs (referred to as a second PUR). In this case, the terminal device 120 may detect whether the ACK information is received from the network device 110 and if the ACK information is detected, transmit the control information to the network device 110. Thus, the first PUR used for transmission of control information follows the second PUR. In some examples, the first PUR may be a next PUR in the set of allocated PURs that follows the second PUR. In other examples, the first PUR may be any other PUR that follows the second PUR such that there are a predefined number of other PURs between the first and second PURs.

The ACK information may be transmitted in downlink control information (DCI), which is supported in data retransmission such as a hybrid automatic repeat request (HARM) procedure using the PURs. If the user data is not successfully received, the network device 110 may transmit negative acknowledgement (NACK) information to the terminal device 120 and then the terminal device 120 may retransmit the user data using the following PUR if any. The control information is transmitted from the terminal device 120 after the user data is successfully transmitted as indicated by receipt of the ACK information. To assist the network device 110 in transmitting the ACK information, the terminal device 120 may also transmit downlink channel state information (for example channel quality information or the number of repetitions required by the control channel to achieve a certain block error rate) as part of the PUR transmission.

At the network side, the network device 110 may decode the uplink signal received on the first PUR to obtain the control information when the ACK information has been sent to indicate successful reception of the user data on the previous second PUR. In some embodiments, the terminal device 120 may transmit the control information with the first TBS and/or the first MCS to the network device 110 after receiving the ACK information. In such case, the network device 110 may perform decoding on the signal received on the first PUR using only the first TBS and the first MCS and perform decoding signals received on other PURs using one or more second TBSs for initial transmission and retransmission of the user data before the ACK. The workload at the network device 110 may be reduced accordingly since no extra simultaneous blind decoding is required. It would be appreciated that in some other embodiments, the terminal device may transmit the control information after receiving the ACK information with the same TBS as used in transmission of the user data.

In some embodiments, the terminal device 120 may not always send the control information each time after receiving the ACK information. The control information may be sent only when the terminal device 120 expects to change the transmission configuration. That is, either new user data or control information may be transmitted from the terminal device 120 on a PUR following the PUR on which the user data has been successfully transmitted. In this case, in order to correctly decode either the control information or the user data, the network device 110 may perform blind decoding on the uplink signal received on the first PUR following the PUR for the successful data transmission, with each of the first dedicated TBS and the second TBS. Since the blind decoding with the first TBS is only needed in the PUR following the PUR for the successful data transmission, the workload at the network side can still be reduced.

The transmission and detection of the control information has been discussed above. Still referring to FIG. 2, if the control information is detected by the network device 110 on the first PUR, the network device 110 optionally transmits 220 feedback information related to the control information to the terminal device 120. The feedback information may be transmitted in DCI or any other downlink control channel.

Depending on the details included in the control information, the feedback information may include different signaling. In the embodiments where the control information includes an explicit request to change the connection status (such as one of the different types of RRC requests) or an implicit request (such as the BSR), the network device 110 may transmit the feedback information comprising an indication of whether the connection status is successfully changed.

For example, if the network device 110 determines to establish or reestablish a connection with the terminal device 120, the feedback information may include a RRC Setup message (for the RRC Connection request) or a RRC Reestablishment message. Upon receipt of such feedback information, the terminal device 120 may be placed into a full RRC connection. Thus, without performing the costly RACH procedure, the terminal device 120 can change to the connected mode in an efficient and effective manner. In some embodiments of the terminal device 120 requiring reconfiguration of the current connection, the network device 110 may transmit a RRC Reconfiguration message in the feedback information to transmit the reconfigured information related to the connection. In some embodiments, if the network device 110 rejects the request to change the connection status, the feedback information may also indicate such result to the terminal device 120.

In some embodiments where the control information includes an explicit or implicit request for reallocation of PURs, the network device 110 may transmit the feedback information related to the reallocation result of the PURs. In some examples, if the terminal device 120 requests to adjust a location in time and/or frequency of at least one of the set of PURs and/or to allocate one or more additional PURs, the network device 110 may transmit the adjusted allocation or a new location(s) in time and/or frequency of the additional PUR(s). In some embodiments, the adjusted location and/or the new location may be indicated by using a location of a predetermined PUR in the set of PURs as a reference. Thus, the network device 110 may indicate a difference or distance between the reference location and the adjusted location or the new location.

For the allocation of the additional PUR, the predetermined PUR used as a reference may be the last PUR in the set of PURs allocated previously. This is especially beneficial if more HARQ retransmissions are needed for transmitting user data. The adjusted location of a certain PUR may also indicated based on a reference location of the first PUR in the set of allocated PURs, a reference location of the PUR immediately prior to the adjusted PUR, or any other predetermined PUR before the adjusted PUR.

In some embodiments, if the location adjustment or the additional allocation is rejected by the network device 110, the feedback information may also indicate such rejection to the terminal device 120. In some embodiments where the terminal device 120 requests to release one or more of the PURs or to adjust the timing alignment offset, the feedback information from the network device 110 may indicate acknowledgement of such release or adjustment. In some other embodiments, the network device 110 may not transmit any feedback information. For example, in the case of relating the PURs or adjusting the timing alignment, the network device 110 may not need to transmit any feedback to the terminal device 120.

According to embodiments of the present disclosure, by transmitting control information to change either the connection status or the allocation of the PURs, the transmission configuration in the transmission mode of using PURs can be dynamically modified without increasing the communication resources as well as the power consumption and time of the terminal device.

Figure 3:
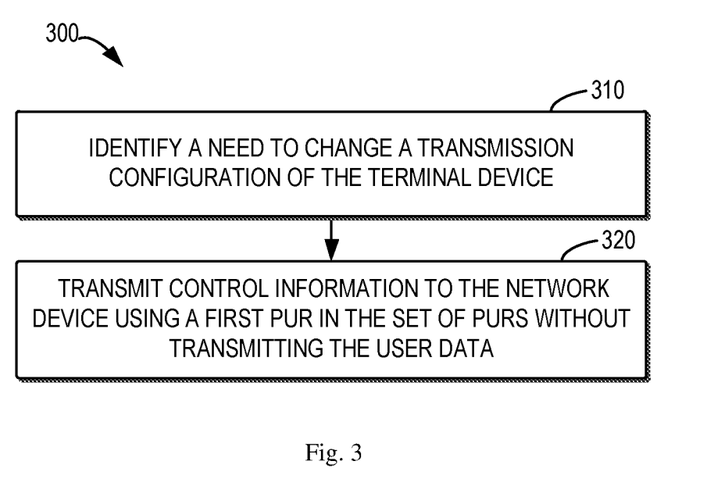
FIG. 3 illustrates a flowchart of a method implemented at a terminal device according to some embodiments of the present disclosure.

FIG. 3 shows a flowchart of an example method 300 implemented at a terminal device in accordance with some embodiments of the present disclosure. For the purpose of discussion, the method 300 will be described from the perspective of the terminal device 120 with reference to FIG. 1.

At block 310, the terminal device 120 identifies a need to change a transmission configuration of the terminal device. The terminal device is in a transmission mode with a set of preconfigured uplink resources (PURs) allocated for the terminal device to transmit user data to a network device. At block 320, the terminal device 120 transmits, in response to identifying the need to change the transmission configuration, control information to the network device using a first PUR in the set of PURs without transmitting the user data, the control information comprising information relevant to the change of the transmission configuration.

In some embodiments, transmitting the control information with a first transport block size that is dedicated for transmission of the control information and/or a first modulation coding schema (MCS), the first transport block size being different from a second transport block size for transmission of the user data, and the first MCS being different from a second MCS for transmission of the user data.

In some embodiments, transmitting the control information comprises: detecting whether acknowledgement (ACK) information indicating successful transmission of the user data using a second PUR in the set of PURs is received from the network device; and in response to the ACK information being received, transmitting the control information using the first PUR, the first PUR following the second PUR.

In some embodiments, transmitting the control information comprises: transmitting the control information in a header of a transport block for the user data.

In some embodiments, the control information indicates a request to change a connection status with the network device, the method 300 further comprising receiving feedback information comprising an indication of whether the connection status is successfully changed.

In some embodiments, the request comprises a scheduling request, a Radio Resource Control (RRC) Connection request, a RRC Reestablishment request, or a request for reconfiguration of a connection with the network device.

In some embodiments, the control information indicates at least one of a request to adjust a location in time and/or frequency of at least one of the set of PURs, a request to allocate an additional PUR, a request to release at least one of the set of PURs, and a request to update timing alignment offset with the network device.

In some embodiments, the method 300 further comprises receiving feedback information comprising an indication of at least one of the adjusted location and a new location in time and/or frequency of the additional PUR, the at least one of the adjusted location and the new location being indicated by using a location of a predetermined PUR in the set of PURs as a reference.

Figure 4:
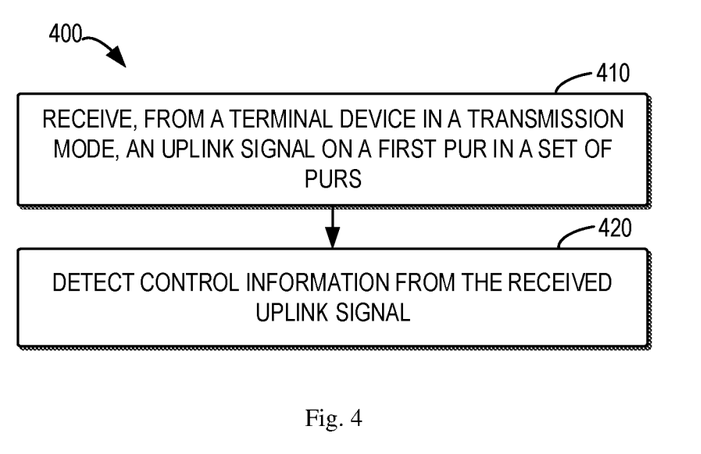
FIG. 4 illustrates a flowchart of a method implemented at a network device according to some embodiments of the present disclosure.

FIG. 4 shows a flowchart of an example method 400 implemented at a network device in accordance with some embodiments of the present disclosure. For the purpose of discussion, the method 400 will be described from the perspective of the network device 110 with reference to FIG. 1.

At block 410, the network device 110 receives, from a terminal device in a transmission mode, an uplink signal on a first preconfigured uplink resource (PUR) in a set of PURs, the set of PURs being allocated in the transmission mode for the terminal device to transmit user data to the network device. At block 420, the network device 110 detects control information from the received uplink signal, the control information comprising information relevant to the change of the transmission configuration in the transmission mode.

In some embodiments, detecting the control information comprises: performing blind decoding on the received uplink signal with each of a first transport block size and a second different transport block size, the first transport block size being dedicated for transmission of the control information, and the second transport block size being available for transmission of the user data; and in response to the received uplink signal being successfully decoded with the first transport block size, detecting a result of the decoding as the control information.

In some embodiments, detecting the control information comprises: determining whether acknowledgement (ACK) information indicating successful transmission of the user data on a second PUR in the set of PURs is transmitted to the terminal device, the first PUR following the second PUR; in response to the ACK information being transmitted, decoding the received uplink signal to obtain the control information.

In some embodiments, detecting the control information comprises: detecting the control information in a header of a transport block for the user data.

In some embodiments, the control information indicates a request to change a connection status with the network device, the method 400 further comprising: transmitting feedback information comprising an indication of whether the connection status is successfully changed.

In some embodiments, the request comprises a scheduling request, a Radio Resource Control (RRC) Connection request, a RRC Reestablishment request, or a request for reconfiguration of a connection with the network device.

In some embodiments, the control information indicates at least one of a request to adjust a location in time and/or frequency of at least one of the set of PURs, a request to allocate an additional PUR, a request to release at least one of the set of PURs, and a request to update timing alignment offset with the network device.

In some embodiments, the method 400 further comprises transmitting feedback information comprising an indication of at least one of the adjusted location and a new location in time and/or frequency of the additional PUR, the at least one of the adjusted location and the new location being indicated by using a location of a predetermined PUR in the set of PURs as a reference.

In some embodiments, an apparatus capable of performing any of the method 300 (for example, the terminal device 120) may comprise means for performing the respective steps of the method 300. The means may be implemented in any suitable form. For example, the means may be implemented in a circuitry or software module.

In some embodiments, the apparatus comprises: means for identifying a need to change a transmission configuration of a terminal device in a transmission mode, a set of PURs being allocated in the transmission mode for the terminal device to transmit user data to a network device; and means for, in response to identifying the need to change the transmission configuration, transmitting control information to the network device using a first PUR in the set of PURs without transmitting the user data, the control information comprising information relevant to the change of the transmission configuration.

In some embodiments, the apparatus further comprises means for performing other steps in some embodiments of the method 300. In some embodiments, the means comprises at least one processor; and at least one memory including computer program code, the at least one memory and computer program code configured to, with the at least one processor, cause the performance of the apparatus.

In some embodiments, an apparatus capable of performing any of the method 400 (for example, the network device 110) may comprise means for performing the respective steps of the method 400. The means may be implemented in any suitable form. For example, the means may be implemented in a circuitry or software module.

In some embodiments, the apparatus comprises: means for receiving, from a terminal device in a transmission mode, an uplink signal on a first preconfigured uplink resource (PUR) in a set of PURs, the set of PURs being allocated in the transmission mode for the terminal device to transmit user data to the network device; and means for detecting control information from the received uplink signal, the control information comprising information relevant to the change of the transmission configuration in the transmission mode.

In some embodiments, the apparatus further comprises means for performing other steps in some embodiments of the method 400. In some embodiments, the means comprises at least one processor; and at least one memory including computer program code, the at least one memory and computer program code configured to, with the at least one processor, cause the performance of the apparatus.

Figure 5:
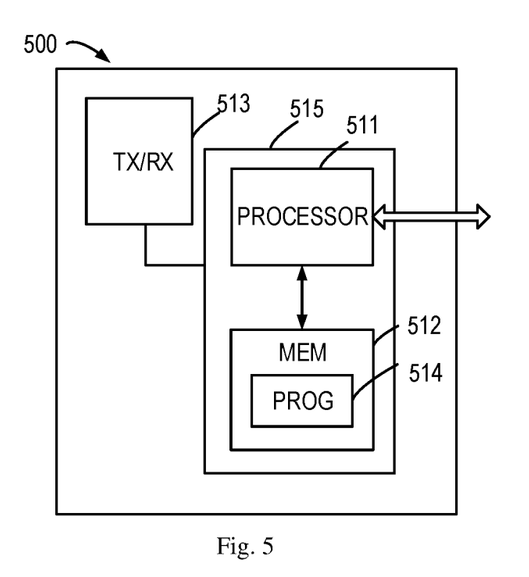
FIG. 5 illustrates a simplified block diagram of an apparatus that is suitable for implementing embodiments of the present disclosure.

FIG. 5 illustrates a simplified block diagram of an apparatus 500 that can be embodied as or comprised in the terminal device 120 or the network device 110 shown in FIG. 1, to implement embodiments of the present disclosure.

The apparatus 500 comprises at least one processor 511, such as a data processor (DP) and at least one memory (MEM) 512 coupled to the processor 511. The apparatus 59 may further include a transmitter TX and receiver RX 513 coupled to the processor 511, which may be operable to communicatively connect to other apparatuses. The MEM 512 stores a program or computer program code 514. The at least one memory 512 and the computer program code 514 are configured to, with the at least one processor 511, cause the apparatus 500 at least to perform in accordance with embodiments of the present disclosure, for example the method 300 or 400.

A combination of the at least one processor 511 and the at least one MEM 512 may form processing means 515 configured to implement various embodiments of the present disclosure.

Various embodiments of the present disclosure may be implemented by computer program executable by the processor 511, software, firmware, hardware or in a combination thereof.

The MEM 512 may be of any type suitable to the local technical environment and may be implemented using any suitable data storage technology, such as semiconductor based memory devices, magnetic memory devices and systems, optical memory devices and systems, fixed memory and removable memory, as non-limiting examples.

The processor 511 may be of any type suitable to the local technical environment, and may include one or more of general purpose computers, special purpose computers, microprocessors, digital signal processors (DSPs) and processors based on multicore processor architecture, as non-limiting examples.

Although some of the above descriptions on the GD based signal detection and staged signal detection are made in the context of a wireless communication system shown in FIG. 1, it should not be construed as limiting the spirit and scope of the present disclosure. The principle and concept of the present disclosure may be more generally applicable to other scenarios.

In addition, the present disclosure may also provide a carrier containing the computer program as mentioned above (e.g., computer instructions/program code 514 in FIG. 5). The carrier includes a computer readable storage medium and a transmission medium. The computer readable storage medium may include, for example, an optical compact disk or an electronic memory device like a RAM (random access memory), a ROM (read only memory), Flash memory, magnetic tape, CD-ROM, DVD, Blue-ray disc and the like. The transmission medium may include, for example, electrical, optical, radio, acoustical or other form of propagated signals, such as carrier waves, infrared signals, and the like.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representations, it is to be understood that block, apparatus, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the method 300 or 400 as described above with reference to FIGS. 3 and 4. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program codes or related data may be carried by any suitable carrier to enable the device, apparatus or processor to perform various processes and operations as described above. Examples of the carrier include a signal, computer readable media.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

For the purpose of the present disclosure as described herein above, it should be noted that, method steps likely to be implemented as software code portions and being run using a processor at a network element or terminal (as examples of devices, apparatuses and/or modules thereof, or as examples of entities including apparatuses and/or modules therefore), are software code independent and can be specified using any known or future developed programming language as long as the functionality defined by the method steps is preserved;

generally, any method step is suitable to be implemented as software or by hardware without changing the idea of the invention in terms of the functionality implemented;

method steps and/or devices, units or means likely to be implemented as hardware components at the above-defined apparatuses, or any module(s) thereof, (e.g., devices carrying out the functions of the apparatuses according to the embodiments as described above, eNode-B etc. as described above) are hardware independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components;

devices, units or means (e.g. the above-defined apparatuses, or any one of their respective means) can be implemented as individual devices, units or means, but this does not exclude that they are implemented in a distributed fashion throughout the system, as long as the functionality of the device, unit or means is preserved;

an apparatus may be represented by a semiconductor chip, a chipset, or a (hardware) module comprising such chip or chipset; this, however, does not exclude the possibility that a functionality of an apparatus or module, instead of being hardware implemented, be implemented as software in a (software) module such as a computer program or a computer program product comprising executable software code portions for execution/being run on a processor;

a device may be regarded as an apparatus or as an assembly of more than one apparatus, whether functionally in cooperation with each other or functionally independently of each other but in a same device housing, for example.

It is noted that the embodiments and examples described above are provided for illustrative purposes only and are in no way intended that the present disclosure is restricted thereto. Rather, it is the intention that all variations and modifications be included which fall within the spirit and scope of the appended claims.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

Various embodiments of the techniques have been described. In addition to or as an alternative to the above, the following examples are described. The features described in any of the following examples may be utilized with any of the other examples described herein.

What is claimed is:

1. A method, comprising:
identifying, by a terminal device, a need to change a transmission configuration of the terminal device, the terminal device being in a transmission mode with a set of preconfigured uplink resources (PURs) allocated for the terminal device to transmit user data to a network device, wherein the terminal device is allowed to transmit uplink data using the set of PURs without requiring to establish a Radio Resource Control (RRC) connection; and
in response to identifying the need to change the transmission configuration, transmitting, by the terminal device, without establishing the RRC connection, control information to the network device using a first PUR in the set of PURs, the control information comprising information relevant to the change of the transmission configuration, wherein the control information indicates a RRC Connection request,
wherein transmitting the control information by the terminal device comprises transmitting, using the first PUR, the control information indicating the RRC Connection request with a first transport block size (TBS) that is dedicated for transmission of the control information, the first TBS being smaller than a second TBS used for transmission of the user data.

2. The method of claim 1, wherein transmitting the control information comprises:
detecting whether acknowledgement (ACK) information indicating successful transmission of the user data using a second PUR in the set of PURs is received from the network device; and
in response to the ACK information being received, transmitting the control information using the first PUR, the first PUR following the second PUR.

3. The method of claim 1, wherein transmitting the control information comprises:
transmitting the control information in a header of a transport block for the user data.

4. The method of claim 1, wherein the control information indicates a request to change a connection status with the network device, the method further comprising:
receiving feedback information comprising an indication of whether the connection status is successfully changed.

5. A terminal device, comprising:
at least one processor; and
at least one memory including computer program code;
the at least one memory and the computer program code being configured to, with the at least one processor, cause the device to
identify a need to change a transmission configuration of the terminal device, the terminal device being in a transmission mode with a set of preconfigured uplink resources (PURs) allocated for the terminal device to transmit user data to a network device, wherein the terminal device is allowed to transmit uplink data using the set of PURs without requiring to establish a Radio Resource Control (RRC) connection;
in response to identifying the need to change the transmission configuration, transmit, without establishing the Radio Resource Control (RRC) connection, control information to the network device using a first PUR in the set of PURs, the control information comprising information relevant to the change of the transmission configuration, wherein the control information indicates a RRC Connection request, and
transmit, using the first PUR, the control information indicating the RRC Connection request with a first transport block size (TBS) that is dedicated for transmission of the control information, the first TBS being smaller than a second TBS used for transmission of the user data.

6. The device of claim 5, wherein the at least one memory and the computer program code are further configured to, with the at least one processor, cause the device to:
detect whether acknowledgement (ACK) information indicating successful transmission of the user data using a second PUR in the set of PURs is received from the network device; and
in response to the ACK information being received, transmit the control information using the first PUR, the first PUR following the second PUR.

7. The device of claim 5, wherein the at least one memory and the computer program code are further configured to, with the at least one processor, cause the device to:
transmit the control information in a header of a transport block for the user data.

8. The device of claim 5, wherein the control information indicates a request to change a connection status with the network device, and the at least one memory and the computer program code are configured to, with the at least one processor, further cause the device to:
  receive feedback information comprising an indication of whether the connection status is successfully changed.

9. The device of claim 5, wherein the control information indicates at least one of a request to adjust a location in time or frequency of at least one of the set of PURs, a request to allocate an additional PUR, a request to release at least one of the set of PURs, and a request to update timing alignment offset with the network device.

10. The device of claim 9, wherein the at least one memory and the computer program code are configured to, with the at least one processor, further cause the device to receive feedback information comprising:
  an indication of at least one of the adjusted location and a new location in time or frequency of the additional PUR, the at least one of the adjusted location and the new location being indicated by using a location of a predetermined PUR in the set of PURs as a reference.

11. A network device, comprising:
  at least one processor; and
  at least one memory including computer program code;
  the at least one memory and the computer program code being configured to, with the at least one processor, cause the device to
    receive, from a terminal device in a transmission mode without establishing a Radio Resource Control (RRC) connection, an uplink signal on a first preconfigured uplink resource (PUR) in a set of PURs, the set of PURs being allocated in the transmission mode for the terminal device to transmit user data to the network device, wherein uplink data is also received from the terminal device using the set of PURs without requiring to establish the RRC connection,
    detect control information from the received uplink signal, the control information comprising information relevant to a change of the transmission configuration in the transmission mode, wherein the control information indicates a RRC Connection request,
    perform blind decoding on the received uplink signal with each of a first transport block size (TBS) and a second TBS, the first TBS being smaller than the second TBS, the first TBS being dedicated for transmission of the control information, and the second TBS being available for transmission of the user data, and
    in response to the received uplink signal being successfully decoded with the first TBS, detect a result of the decoding as the control information.

12. The device of claim 11, wherein the at least one memory and the computer program code are further configured to, with the at least one processor, cause the device to:
  determine whether acknowledgement (ACK) information indicating successful transmission of the user data on a second PUR in the set of PURs is transmitted to the terminal device, the first PUR following the second PUR; and
  in response to the ACK information being transmitted, decode the received uplink signal to obtain the control information.

13. The device of claim 11, wherein the at least one memory and the computer program code are further configured to, with the at least one processor, cause the device to:
  detect the control information in a header of a transport block for the user data.

14. The device of claim 11, wherein the control information indicates a request to change a connection status with the network device, and wherein the at least one memory and the computer program code are configured to, with the at least one processor, further cause the device to:
  transmit feedback information comprising an indication of whether the connection status is successfully changed.

15. A non-transitory computer readable medium comprising program instructions for causing an apparatus to perform at least the method of claim 1.

* * * * *